United States Patent
Ishiyama

(10) Patent No.: US 8,709,532 B2
(45) Date of Patent: Apr. 29, 2014

(54) MAGNETIC DISK AND MANUFACTURING METHOD THEREOF

(75) Inventor: Masafumi Ishiyama, Singapore (SG)

(73) Assignee: WD Media (Singapore) Pte. Ltd., Singapore (SG)

( * ) Notice: Subject to any disclaimer, the term of this patent is extended or adjusted under 35 U.S.C. 154(b) by 144 days.

(21) Appl. No.: 12/758,195

(22) Filed: Apr. 12, 2010

(65) Prior Publication Data

US 2010/0196619 A1    Aug. 5, 2010

Related U.S. Application Data

(62) Division of application No. 11/050,791, filed on Feb. 7, 2005, now Pat. No. 7,722,968.

(30) Foreign Application Priority Data

Feb. 6, 2004  (JP) ................................. 2004-030295

(51) Int. Cl.
  *G11B 5/84*  (2006.01)
(52) U.S. Cl.
  USPC ..................... 427/130; 428/843.5; 428/843.3; 428/833.3; 29/898.1
(58) Field of Classification Search
  CPC ..................................................... G11B 5/725
  USPC ............... 427/127, 130; 29/898.1; 428/833.3, 428/843.3, 841.3, 843.5, 817, 844, 833.6, 428/833.4, 833.7, 840.4
  See application file for complete search history.

(56) References Cited

U.S. PATENT DOCUMENTS

| | | | |
|---|---|---|---|
| 4,849,305 A | | 7/1989 | Yanagisawa |
| 5,057,623 A | * | 10/1991 | Kai et al. ................... 564/82 |
| 6,099,762 A | * | 8/2000 | Lewis ...................... 264/1.33 |
| 6,238,796 B1 | | 5/2001 | Liu et al. |
| 6,511,716 B1 | * | 1/2003 | Itai et al. ................... 427/515 |
| 6,740,414 B2 | | 5/2004 | Yatsue |
| 6,753,060 B1 | | 6/2004 | Liu et al. |
| 2003/0219630 A1 | * | 11/2003 | Moriwaki et al. ........ 428/694 R |
| 2005/0008901 A1 | | 1/2005 | Usuki et al. |
| 2005/0090408 A1 | * | 4/2005 | Burns ...................... 508/270 |

FOREIGN PATENT DOCUMENTS

| | | |
|---|---|---|
| JP | 2003-113389 A | 4/2003 |
| JP | 2003-248917 A | 9/2003 |
| JP | 2003-288720 A | 10/2003 |
| JP | 2004-022026 A | 1/2004 |

OTHER PUBLICATIONS

A. F. Lagalante, journal of Chem. Eng. Data(2002), 74, 47-51.*

\* cited by examiner

*Primary Examiner* — Michael Cleveland
*Assistant Examiner* — Tabassom Tadayyon Eslami

(57) ABSTRACT

In a magnetic disk having a magnetic layer, a protection layer, and a lubrication layer formed on a substrate in this order, a surface free energy $\gamma S$ of a surface of the magnetic disk derived by an extended Fowkes equation is greater than 0 and no greater than 24 mN/m. $\gamma Sd$ (dispersion force component of surface free energy) forming the surface free energy $\gamma S$ is greater than 0 and no greater than 17 mN/m, $\gamma Sp$ (dipole component of surface free energy) forming the surface free energy $\gamma S$ is greater than 0 and no greater than 1 mN/m, and $\gamma Sh$ (hydrogen bonding force component of surface free energy) forming the surface free energy $\gamma S$ is greater than 0 and no greater than 6 mN/m.

11 Claims, 1 Drawing Sheet

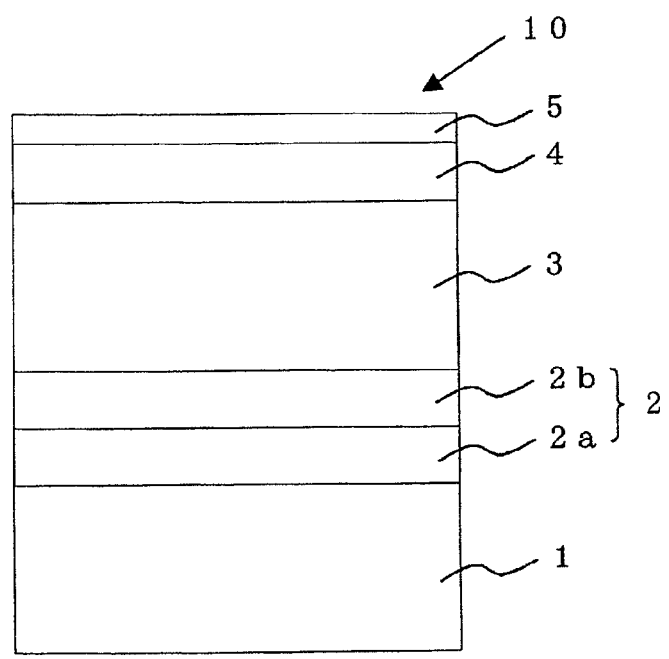

MAGNETIC DISK AND MANUFACTURING METHOD THEREOF

This is a divisional of application Ser. No. 11/050,791 filed Feb. 7, 2005 now U.S. Pat. No. 7,722,968. The entire disclosure(s) of the prior application(s), application Ser. No. 11/050,791 now U.S. Pat. No. 7,722,968 is hereby incorporated by reference.

This application claims priority to prior Japanese Patent Application No. 2004-30295, the disclosure of which is incorporated herein by reference.

BACKGROUND OF THE INVENTION

This invention relates to a magnetic disk for use in a magnetic recording device (HDD, Hard Disk Drive) or the like and a manufacturing method thereof. More specifically, this invention relates to a magnetic disk that can prevent a fly stiction trouble, a corrosion failure, and so on to suppress a malfunction and is thus excellent in safety even when a magnetic head performs a flying operation at a flying height of, for example, 10 nm or less, and a manufacturing method of the magnetic disk.

An LUL (Load Unload) system capable of higher recording capacity has started to be employed in HDDs (Hard Disk Drives) in recent years. In the LUL system, upon halting, a magnetic recording head is retreated to a slope bed called a ramp located outside a magnetic disk while, upon starting, the magnetic recording head is, after the magnetic disk starts rotation, slided from the ramp over the surface of the magnetic disk, and then recording/reproduction is carried out. Therefore, the magnetic recording head does not contact and slide on the magnetic disk.

In this LUL system, it is not necessary to provide a contact/slide region (CSS zone) for the magnetic recording head on the surface of the magnetic disk, which is required in the CSS system conventionally used. Therefore, it is possible to ensure a wider area of a recording/reproduction region as compared with the CSS system and thus increase the recording capacity of the magnetic recording medium. Further, in the LUL system, since the magnetic disk and the magnetic recording head do not contact each other, it is not required to provide texture for preventing contact adsorption, which is required in the CSS system, so that the surface of the magnetic disk can be made even smoother. Therefore, the recording density of the magnetic disk can be increased by reducing the flying height of the magnetic recording head as compared with the CSS system.

As such a magnetic disk, there is known a magnetic recording medium as disclosed in, for example, Japanese Unexamined Patent Application Publication (JP-A) No. 2003-248917.

On the other hand, in a magnetic recording device (HDD), volatile organic gases such as sulfur-based organic compound, chlorine-based organic compound, dioctyl phthalate, acrylic acid, and siloxane, acid gas, and so on are emitted at a certain ratio from various organic materials such as adhesives and plastic materials that are used in the device. Therefore, the organic gas, the acid gas, or the like tends to be adsorbed to a magnetic recording medium in an environment of, for example, high temperature and high humidity. Further, interaction occurs between the adsorbed gas and a lubricant of a lubrication layer so that the lubrication layer is liable to change in quality.

Such problems are becoming remarkable particularly following a reduction in flying height of a magnetic head. When the magnetic head flies over the surface of a magnetic disk at a low flying height (e.g. a small flying height of 10 nm or less), the magnetic head gathers up the organic compound etc. and the lubricant adsorbed on the surface of the magnetic disk, which tend to be transferred and deposited on the surface of the magnetic head. Particularly, in the case of a magnetic head having an NPAB slider (negative pressure slider), a strong negative pressure occurs at a lower surface (surface on the side of the magnetic disk) of the magnetic head to gather up, like a vacuum cleaner, the organic compound etc. and the lubricant adsorbed on the surface of the magnetic disk so that they tend to be transferred and deposited on the surface of the magnetic head.

If this transfer state exceeds a certain level, a trouble called a fly stiction phenomenon and a corrosion failure occur. The fly stiction is a trouble where the flying posture and height of the magnetic recording head go out of order during its flying operation and irregular changes in reproduction output occur frequently. According to circumstances, the magnetic recording head is brought into contact with the magnetic recording medium to crash during the flying operation, thereby destroying the magnetic disk. This fly stiction often occurs without a premonitory sign and is one of troubles that are difficult to control.

In the conventional CSS system, the CSS operation at the time of starting and stopping serves to perform cleaning of the lubricant and the organic compound etc. transferred to the magnetic recording head and, therefore, those troubles do not raise a problem.

On the other hand, in the LUL system, since there is no sliding movement between the magnetic recording medium and the magnetic recording head, there is no function of cleaning the lubricant and the organic compound etc. transferred to the head. Therefore, particularly in the LUL system, the lubricant and the organic compound etc. tend to be transferred and deposited on the magnetic recording head so that the fly stiction is liable to occur and a head element portion is liable to be corroded. Further, if this deposition advances, it often drops on the surface of the medium as deposits to damage a protection film to thereby enable recording and reproduction. Since the flying height of the magnetic recording head has still been reduced (10 nm or less) following the shift to the LUL system from the CSS system, the transfer and deposition onto the head has been further facilitated.

In addition, recently, magnetic disk devices such as HDDs (hard disk drives) have been often used in environments of low atmospheric pressures such as in an airplane. Following it, there has been arising a problem about flying stability of heads. Specifically, the flying height of the magnetic head further decreases from 10 nm due to a change in atmospheric pressure and, further, there occurs variation in flying height due to processing accuracy of air bearing sliders of the magnetic heads. As a result, a problem of the fly stiction has occurred frequently.

Further, recent magnetic disk devices such as HDDs (Hard Disk Drives) have been miniaturized and incorporated into digital cameras and music reproducing players. Under these circumstances, external pressures such as any environments (in airplane as described before, mountaintop, high temperature, low temperature, high humidity, low humidity) and any using manners (desktop, portable) affect flying properties (stable flying performance) of heads in magnetic disk devices and outgases from members in the magnetic disk devices.

As a cause for occurrence of the fly stiction, there can be considered the influence of roughness of the surface of the magnetic disk, interaction (meniscus force) between the lubrication layer and the head, or contamination due to outgas from the magnetic disk device.

SUMMARY OF THE INVENTION

It is therefore an object of this invention to provide a magnetic disk that can prevent a fly stiction trouble, a corrosion failure, and so on to suppress a malfunction and is thus excellent in safety even when a magnetic head performs a flying operation at a flying height of, for example, 10 nm or less and, in particular, the magnetic disk that is suitable for an HDD of the LUL system.

It is another object of this invention to provide a method of efficiently manufacturing the magnetic disk.

In order to achieve the foregoing objects, the present inventor has studied, with respect to the fly stiction phenomenon liable to occur particularly in the LUL system, about causal relation to a lubricant, thickness of the lubricant, adhesion of the lubricant, a protection layer, shape of a magnetic recording head, flying height thereof, and so on. As a result, the present inventor has found that the fly stiction phenomenon has a close relationship with surface energy of the surface of a magnetic disk.

That is, the present inventor has found that it is effective to the fly stiction to reduce the surface energy of the magnetic disk surface to thereby minimize organic matter adhering to the outermost surface of the magnetic disk.

Specifically, the present inventor has found that, in order to prevent the fly stiction trouble and the corrosion failure and achieve excellent LUL durability, it is important to inactivate the outermost surface of the magnetic disk to a predetermined degree. The present inventor has understood that, in this event, it is not sufficient to merely specify desired values of surface free energy and critical surface tension of the magnetic disk surface, but it is necessary to simultaneously specify respective components forming them.

Substances adherable or adsorbable to the magnetic disk surface and lubricants are diversified. Therefore, although merely referring to the degree of inactivation or the desired value of the surface free energy, the desired value differs per substance or compound. However, it is practically impossible to assume, in advance, all individual substances or compounds that are adherable or adsorbable to the magnetic disk surface and specify the degrees of inactivation with respect to all those substances.

The present inventor has found that if it is possible to decompose surface free energy into respective components paying attention to its properties and set desired values of the respective components to prescribed values that are preferable to solve the problems for this invention, the problems can be solved without the necessity for specifying the inactivity degrees about individual substances one by one in advance.

Further, the present inventor has found that it is effective to treat the magnetic disk surface by the use of a composition containing hydrofluoroether, as means for specifying surface free energy and critical surface tension, specified by this invention, to desired values. Specifically, a treatment is carried out so that the composition containing hydrofluoroether is brought into contact with the surface of a magnetic disk that has finally been formed with a lubrication layer.

In the process of forming a lubrication layer in a magnetic disk, preparation is made of a solution in which a perfluoropolyether-based lubricant is dispersed and dissolved in a fluorine-based solvent such as HFC (hydrofluorocarbon) or PFC (perfluorocarbon). A magnetic disk finally formed with a protection layer is dipped into this solution to perform application by a dipping method or the like, thereby forming the lubrication layer.

A perfluoropolyether-based lubricant for use in a magnetic disk has a main chain portion containing fluorine and polar groups as functional groups at ends of this main chain. As the polar groups, use is made of, for example, hydroxyl groups, carboxyl groups, or other polar groups. Since the main chain portion of the lubricant has a flexible structure, the lubricant exhibits suitable lubrication performance, while the polar groups at the end portions exhibit an action of adhering to a protection layer by intermolecular force or the like. Therefore, this lubricant is fixed on the magnetic disk as a lubrication layer (film). Normally, it has two to four polar groups as functional end groups.

The present inventor has paid attention to the presence of these polar groups. That is, if the polar groups as end groups of the lubricant forming the lubrication layer are completely oriented toward the side of the protection layer, the surface of the lubrication layer is covered with main chains (fluorine etc.) of perfluoropolyether. As a result, it is expected that the magnetic disk surface exhibits very low surface free energy and very low critical surface tension. However, actually, because of orientation of a substance forming the protection layer and orientation of the lubricant, a cubic structure of the lubricant itself, and so on, the polar groups being the end groups are not completely oriented toward the side of the protection layer. Therefore, it is considered that a certain amount of polar groups are exposed on the magnetic disk surface after the formation of the lubrication layer.

Because of the exposure of the polar groups on the lubrication layer surface, i.e. the magnetic disk surface, surface free energy and critical surface tension of the magnetic disk surface become large. This is considered to prevent desired inactivation. Therefore, the present inventor has paid attention to an idea that if a treatment is performed to inactivate the polar groups, being the functional groups of the lubricant, exposed on the surface, desired inactivity degrees may be obtained.

It is considered that this mechanism is derived from a structure of HFE (hydrofluoroether). That is, HFE has a structural formula of $C_nF_{2n+1}$—O—R ($R=C_nH_{2n+1}$) and has an ether bond between $C_nF_{2n+1}$ group and R ($R=C_nH_{2n+1}$) group. When the treatment is performed to contact hydrofluoroether with the surface of the magnetic disk finally formed with the lubrication layer, those ether bond groups are bonded, by intermolecular force or hydrogen bonding force, to the functional end groups (polar groups) of the perfluoropolyether lubricant that are not oriented toward the protection layer surface. As a result, the outermost surface of the magnetic disk is considered to be substantially $C_nF_{2n+1}$ groups and R ($R=C_nH_{2n+1}$) groups. Accordingly, it is considered that the exposed polar groups can be inactivated.

This invention has been completed on the basis of the foregoing knowledge.

Specifically, this invention has the following structures.

(Structure 1)

A magnetic disk having a magnetic layer, a protection layer, and a lubrication layer formed on a substrate in this order, wherein a surface free energy $\gamma S$ of a surface of the magnetic disk derived by an extended Fowkes equation is greater than 0 and no greater than 24 mN/m, $\gamma Sd$ (dispersion force component of surface free energy) forming the surface free energy $\gamma S$ is greater than 0 and no greater than 17 mN/m, $\gamma Sp$ (dipole component of surface free energy) forming the surface free energy $\gamma S$ is greater than 0 and no greater than 1 mN/m, and $\gamma Sh$ (hydrogen bonding force component of surface free energy) forming the surface free energy $\gamma S$ is greater than 0 and no greater than 6 mN/m (hereinafter referred to as a magnetic disk I).

(Structure 2)
A magnetic disk having a magnetic layer, a protection layer, and a lubrication layer formed on a substrate in this order, wherein a surface free energy $\gamma S$ of a surface of the magnetic disk derived by a Van-Oss equation is greater than 0 and no greater than 22 mN/m, $\gamma SLW$ forming the surface free energy $\gamma S$ is greater than 0 and no greater than 17 mN/m, $\gamma S^-$ forming the surface free energy $\gamma S$ is greater than 0 and no greater than 6 mN/m, and $\gamma S^+$ forming the surface free energy $\gamma S$ is greater than 0 and no greater than 1 mN/m (hereinafter referred to as a magnetic disk II).

(Structure 3)
A magnetic disk having a magnetic layer, a protection layer, and a lubrication layer formed on a substrate in this order wherein, a critical surface tension $\gamma c$ of a surface of the magnetic disk derived by a Zisman equation is greater than 0 and no greater than 17 mN/m (hereinafter referred to as a magnetic disk III).

(Structure 4)
A magnetic disk of structure 1 or 2, wherein a critical surface tension $\gamma c$ of the surface of the magnetic disk derived by a Zisman equation is greater than 0 and no greater than 17 mN/m.

(Structure 5)
A manufacturing method of a magnetic disk having a magnetic layer, a protection layer, and a lubrication layer formed on a substrate in this order, comprising treating a surface of the magnetic disk by the use of a composition containing hydrofluoroether after formation of the lubrication layer.

(Structure 6)
A manufacturing method of a magnetic disk of structure 5, wherein, after forming the lubrication layer on a surface of the protection layer, the disk is heated in a clean room before and/or after the treatment by the use of the composition containing hydrofluoroether.

(Structure 7)
A manufacturing method of a magnetic disk of structure 5 or 6, wherein the hydrofluoroether has a molecular weight of 150 to 400.

(Structure 8)
A manufacturing method of a magnetic disk of structure 5 or 6, wherein the lubrication layer is formed by a film of a perfluoropolyether compound having polar groups at ends.

(Structure 9)
A manufacturing method of a magnetic disk of structure 5 or 6, wherein the protection layer is an amorphous carbon protection layer formed by a plasma CVD method.

According to this invention, even when a magnetic head performs a flying operation at a flying height of, for example, 10 nm or less, a fly stiction trouble, a corrosion failure, and so on can be prevented so that a malfunction is suppressed. As a result, it is possible to provide a magnetic disk excellent in safety, particularly the magnetic disk suitable for an HDD of the LUL system, and a method of efficiently manufacturing such a magnetic disk.

BRIEF DESCRIPTION OF THE DRAWINGS

The sole FIGURE is a sectional view exemplarily showing one example of a layer structure of a magnetic disk of this invention.

DETAILED DESCRIPTION OF THE PREFERRED EMBODIMENT

A magnetic disk of this invention is a magnetic disk having a magnetic layer, a protection layer, and a lubrication layer that are formed in this order.

The protection layer is not particularly limited but is preferably a carbon-based protection layer. As a structure, it is preferably a protection layer made of amorphous carbon. Specifically, it can be an amorphous diamond-like carbon protection layer. By the use of such a carbon-based protection layer, suitable LUL durability can be obtained.

In this invention, the thickness of the carbon-based protection layer is preferably 1 to 5 nm. When less than 1 nm, there is a problem in abrasion resistance. Although it is not necessary to particularly provide an upper limit to the thickness of the carbon-based protection layer, it is preferably set to 5 nm or less on a practical basis so as not to impede the improvement in magnetic spacing.

Further, in the case of the carbon-based protection layer, it is, as a composition, preferably a hydrogenated carbon protection layer containing hydrogen. By the use of hydrogenated carbon, the protection performance becomes high with a fine structure and therefore it is suitable as a magnetic disk for the LUL system. In this case, it is preferable that the content of hydrogen be set to 3 atm % or more and less than 20 atm % relative to the total of the carbon-based protection layer when measuring it by HFS (Hydrogen Forward Scattering). When the content of hydrogen relative to the carbon-based protection layer is less than 3 atm %, the fineness or hardness is often lowered and therefore the magnetic layer cannot be suitably protected from an impulsive force upon the start of LUL. On the other hand, when the content of hydrogen is 20 atm % or more, polymeric carbon components increase. As a result, adhesion performance of the protection layer with respect to the magnetic layer is reduced and therefore the protection layer is often stripped off upon the start of LUL, which is thus not preferable.

It is further preferable to use a carbon nitride protection layer or a hydrogenated carbon nitride protection layer which is in the form of a carbon-based protection layer containing nitrogen. This is because, by the inclusion of nitrogen, it is possible to highly promote orientation of polar end groups of the lubricant toward the side of the protection layer. Therefore, when combined with this invention, it is possible to obtain a particularly preferable effect. The content of nitrogen relative to carbon can be 4 to 12 atm % when measured by XPS (X-ray Photoelectron Spectroscopy).

In this invention, the carbon-based protection layer is preferably a protection layer formed by CVD (Chemical Vapor Deposition). Particularly, it is preferable that the carbon-based protection layer be formed by plasma CVD (P-CVD) that uses plasma to excite atoms. This is because the carbon-based protection layer formed by P-CVD is high in fineness and hardness and thus excellent in LUL durability. When forming the carbon-based protection layer by P-CVD, it is preferable that diamond-like carbon is formed using a hydrocarbon gas as a reactive gas.

As the reactive gas, it is preferable to use low-grade hydrocarbon. Particularly, use is preferably made of any of low-grade saturated hydrocarbon, low-grade unsaturated hydrocarbon, and low-grade ring hydrocarbon. As the low-grade saturated hydrocarbon, use can be made of methane, ethane, propane, butane, octane, or the like. As the low-grade unsaturated hydrocarbon, use can be made of ethylene, propylene, butylene, acetylene, or the like. As the low-grade ring hydrocarbon, use can be made of benzene, toluene, xylene, styrene, naphthalene, cyclohexane, or the like. Note that low-grade referred to herein represents hydrocarbon where the number of carbons per molecule is 1 to 10. The reason why use of the low-grade hydrocarbon is preferable is that as the number of carbons increases, it becomes difficult to vaporize it into gas and supply it to a film-forming apparatus and, in addition, it becomes difficult to decompose it during plasma discharge. Further, when the number of carbons increases, high-molecular hydrocarbon components tend to be largely contained in components of the formed protection layer to thereby reduce the fineness and hardness of the protection layer, which is thus not preferable. In view of this, it is preferable to use the low-grade hydrocarbon as hydrocarbon. It is particularly preferable to use acetylene because a fine and high-hardness carbon-based protection layer can be formed.

In this invention, the lubrication layer is preferably a layer in the form of a film of a perfluoropolyether lubricant having hydroxyl groups as end groups. Particularly, it is preferably a perfluoropolyether compound refined in a predetermined manner by the use of a supercritical fluid extraction method. The main chain of the perfluoropolyether compound has a straight chain structure to thereby exhibit proper lubrication performance for the magnetic disk and, because of including hydroxyl groups (OH), as polar groups, being end groups, it can demonstrate high adhesion performance with respect to the carbon-based protection layer. Particularly, in the case of containing nitrogen on the surface of the carbon-based protection layer, since ($N^+$) and ($OH^-$) exhibit high affinity, high adhesion rate of the lubrication layer can be achieved, which is thus preferable.

As the perfluoropolyether compound having hydroxyl groups as end groups, it is preferable that the number of hyroxyl groups per molecule be 2 to 4. When less than two, there is a case where the adhesion rate of the lubrication layer is lowered, which is thus not preferable. When exceeding four, there is a case where the lubrication performance is reduced due to excessive improvement in adhesion rate. The thickness of the lubrication layer may be properly adjusted within the range of 0.5 to 1.5 nm. When less than 0.5 nm, there is a case where the lubrication performance is reduced, while, when exceeding 1.5 nm, there is a case where the adhesion rate of the lubrication layer is lowered.

In this invention, it is preferable that, after forming the lubrication layer, the surface of the lubrication layer, i.e. the surface of the magnetic disk, be treated with HFE (hydrofluoroether). Specifically, it is preferable to perform a treatment where HFE (hydrofluoroether) is brought into contact with the magnetic disk having been formed with the lubrication layer. For example, the treatment can be carried out by a vapor deposition method, an immersion method, or the like. Through the treatment in this manner, HFE (hydrofluoroether) is formed as a film on the surface of the lubrication layer of the magnetic disk.

The hydrofluoroether compound used in the HFE (hydrofluoroether) treatment is preferably a compound having a molecular weight of about 150 to 400. Particularly, it is preferable to select a compound having a molecular weight of 350 or less. Specifically, use can be preferably made of $C_4F_9$—O—$CH_3$ and/or $C_4F_9$—O—$C_2H_5$. Further, the surface tension of hydrofluoroether is preferably set greater than 0 and no greater than 14 mN/m.

According to this invention, it is preferable to apply a heat treatment to the magnetic disk in a clean room after the formation of the lubrication layer. In this event, the clean degree is set to a clean atmosphere equal to or higher than class 6 defined in Japanese Industrial Standard (JIS) B9920. By performing the heat treatment in a clean atmosphere of class 1 to 6, it is possible to promote orientation of the end polar groups of perfluoropolyether main chains toward the protection layer. The heat treatment temperature can be set in the range of about 80° C. to 150° C. The heat treatment can be carried out before and/or after the HFE (hydrofluoroether) treatment, after the formation of the lubrication layer. Preferably, it is carried out after the HFE (hydrofluoroether) treatment.

In this invention, a glass substrate is preferably used as a substrate. The glass substrate can achieve smoothness and high rigidity. Therefore, the magnetic spacing, particularly the flying height of the magnetic head, can be further reduced stably, which is thus particularly preferable in this invention. As a material of the glass substrate, aluminosilicate glass is particularly preferable. Aluminosilicate glass can achieve high rigidity and strength by chemical strengthening.

In this invention, the surface roughness of the magnetic disk surface is preferably 4 nm or less at Rmax and 0.4 nm or less at Ra. When Rmax exceeds 4 nm, the reduction in magnetic spacing is often avoided, which is thus not preferable. It is noted here that the surface roughness referred to herein is defined in Japanese Industrial Standard (JIS) B0601.

Further, in this invention, a CoPt-based ferromagnetic layer can be used as the magnetic layer being a magnetic recording layer. The magnetic layer can be formed on the substrate by a film forming method such as a sputtering method.

Next, in the magnetic disk I of this invention, in order to achieve the objects of this invention, it is necessary to satisfy the condition that a surface free energy γS of the magnetic disk surface derived by an extended Fowkes equation, which will be explained below, is greater than 0 and no greater than 24 mN/m, γSd (dispersion force component of surface free energy) forming the surface free energy γS is greater than 0 and no greater than 17 mN/m, γSp (dipole component of surface free energy) forming the surface free energy γS is greater than 0 and no greater than 1 mN/m, and γSh (hydrogen bonding force component of surface free energy) forming the surface free energy γS is greater than 0 and no greater than 6 mN/m.

<Extended Fowkes Equation>

This is a theory proposed by Fowkes in 1964. When the surface tension is largely divided into a dispersion component (only London force) and a polar component (including Debye force and hydrogen bonding force), $$\gamma = \gamma d + \gamma p \quad (1)$$

γd: dispersion component
γp: polar component
Here, given that WSL: the work of adhesion between solid and liquid, $$WSL = WSLd + WSLp \quad (2)$$

WSLd: dispersion component of adhesion work
WSL: polar component of adhesion work
Here, when a geometric average is calculated only with respect to the dispersion component of liquid and solid from (2), $$WSLd = (\gamma Sd \cdot \gamma Ld)0.5 \quad (3)$$

From this equation and the Dupre-Young equation, $$\gamma L(1+\cos\theta) = 2(\gamma Sd \cdot \gamma Ld)0.5 \quad (4)$$

From equation (4), γSd can be calculated.
Note that θ is a contact angle between a liquid and a solid body surface (the same shall apply hereinafter).

Fowkes gives consideration only to the dispersion force as an interaction. On the other hand, in this invention, use is made of an extended Fowkes equation that takes into account a surface interaction force γSp caused by an intermolecular force based on polarity such as a permanent polar effect and an induced polar effect, and a hydrogen bonding interaction force γSh.

$$WAB=\gamma L(1+\cos\theta)=2(\gamma Sd \cdot \gamma Ld)0.5+2(\gamma Sp \cdot \gamma Lp)0.5+2(\gamma Sh \cdot \gamma Lh)0.5$$

$$\cos\theta=\{2(\gamma Sd \cdot \gamma Ld)0.5+2(\gamma Sp \cdot \gamma Lp)0.5+2(\gamma Sh \cdot \gamma Lh)0.5\}/\gamma L-1$$

By measuring by the use of liquids of which γLd, γLp, and γLh are known, the foregoing equations become simultaneous equations so that γSd, γSp, and γSh can be determined.

On the other hand, in the magnetic disk II of this invention, in order to achieve the objects of this invention, it is necessary to satisfy the condition that a surface free energy γS of the magnetic disk surface derived by a Van-Oss equation, which will be explained below, is greater than 0 and no greater than 22 mN/m, γSLW forming the surface free energy γS is greater than 0 and no greater than 17 mN/m, γS⁻ forming the surface free energy γS is greater than 0 and no greater than 6 mN/m, and γS⁺ forming the surface free energy γS is greater than 0 and no greater than 1 mN/m.

<Van-Oss Equation>

This is a theory proposed by Van Oss in 1987 giving consideration to an acid-base interaction.

$$\gamma=\gamma LW+\gamma ab \quad (7)$$

γLW: Lifshitz-Van der Waals force (including London force and Debye and Keesom force)

γab: acid-base interaction

Van Oss takes γab as a geometric average of a giving component γ⁻ and a receiving component γ⁺ and derives equation (8).

$$\gamma=\gamma LW+2(\gamma^- \cdot \gamma^+)0.5 \quad (8)$$

From equations (3) and (4) of adhesion work, $$WSLd=(\gamma Sd \cdot \gamma Ld)0.5 \quad (3)$$

from this equation and the Dupre-Young equation, $$\gamma L(1+\cos\theta)=2(\gamma Sd \cdot \gamma Ld)0.5 \quad (4)$$

$$WAB=\gamma L(1+\cos\theta)=2(\gamma SLW \cdot \gamma LLW)0.5+2(\gamma S^- \cdot \gamma L^+)0.5+2(\gamma S^+ \cdot \gamma L^-)0.5 \quad (9)$$

By rearranging equation (9), $$\cos\theta=\{2(\gamma SLW \cdot \gamma LLW)0.5+2(\gamma S^- \cdot L^+)0.5+2(\gamma S^+ \cdot \gamma L^-)0.5\}/\gamma L-1 \quad (10)$$

Further, γS is $$\gamma S=\gamma SLW+\gamma SA \cdot B=\gamma SLW+2\sqrt{(\gamma S^+ \cdot \gamma S^-)}$$

[γSA·B is a surface energy of acid-base interaction and γSA·B=2√(γS⁺·γS⁻)]

Therefore, by measuring by the use of liquids of which γL, γLLW, γL⁺, and γL⁻ are known, γSLW, γS⁻, γS⁺, and γS can be determined.

Further, in the magnetic disk III of this invention, in order to achieve the objects of this invention, it is necessary to satisfy the condition that a critical surface tension γc of the magnetic disk surface derived by a Zisman equation, which will be explained below, is greater than 0 and no greater than 17 mN/m.

<Zisman Equation>

This is widely used as a technique for calculating a critical surface tension (γc). By the use of a plurality of liquids each having only a Van der Waals force on a solid body surface and having a known surface tension, angles (contact angles θ) formed between the liquids and the solid body surface immediately after dropping of the liquids are measured, respectively. When plotting the surface tensions of the liquids on x-axis and cos θ on y-axis, a straight line descending rightward is obtained (Zisman Plot). The surface tension when Y=1(θ=0) on this straight line is calculated as a critical surface tension γc.

It is preferable that the magnetic disks I and II respectively satisfy the condition of the magnetic disk III.

These magnetic disks of this invention each can be suitably used as a magnetic disk for use in an HDD of the LUL system.

FIG. 1 is a sectional view exemplarily showing one example of a layer structure of a magnetic disk of this invention. This magnetic disk 10 comprises at least a substrate 1, a magnetic layer 3 formed on the substrate, a protection layer 4 formed on the magnetic layer 3, and a lubrication layer 5 formed on the protection layer 4. In this example, the magnetic layer 3 and the protection layer 4 are formed so as to contact each other and the protection layer 4 and the lubrication layer 5 are formed so as to contact each other.

Between the substrate 1 and the magnetic layer 3, a non-magnetic metal layer 2 comprising a seed layer 2a and an underlayer 2b is formed. In the magnetic disk 10, all except the magnetic layer 3 are nonmagnetic substances.

Further, this invention also provides a manufacturing method of the magnetic disk 10 having the magnetic layer 3, the protection layer 4, and the lubrication layer 5 formed on the substrate 1 in this order. The surface of the magnetic disk is treated with a composition containing hydrofluoroether after the formation of the lubrication layer 5.

In the manufacturing method of the magnetic disk of this invention, as described before, it is preferable that, after forming the lubrication layer 5 on the magnetic disk surface, the magnetic disk 10 be heated in a clean room before and/or after the treatment by the use of the composition containing hydrofluoroether. Hydrofluoroether preferably has a molecular weight of 150 to 400. Further, it is preferable that the lubrication layer 5 be formed by a film of a perfluoropolyether compound having polar groups at ends. The protection layer 4 is preferably an amorphous carbon protection layer formed by plasma CVD.

EXAMPLES

Now, this invention will be described in further detail by the use of examples, but this invention is not limited at all by those examples.

Example 1

A magnetic disk 10 for the LUL system having a structure shown in FIG. 1 was manufactured.

First, aluminosilicate glass was formed into a disk shape to obtain a glass disk. By applying grinding, precision polishing, end-face polishing, precision cleaning, and chemical strengthening to the obtained glass disk, a flat, smooth, and high-rigidity glass substrate 1 for a magnetic disk was obtained. This glass substrate 1 was a 2.5-inch magnetic disk substrate having a diameter of 65 mm, an inner diameter of 20 mm, and a disk thickness of 0.635 mm.

Here, observing the surface roughness of the obtained glass substrate 1 by the use of an AFM (Atomic Force Microscope), it was confirmed to be a smooth surface having Rmax of 3.96 nm and Ra of 0.36 nm.

Then, by the use of a static opposed type film-forming apparatus, a seed layer 2a, an underlayer 2b, and a magnetic layer 3 were formed on the glass substrate 1 in this order by DC magnetron sputtering. Specifically, first, using an AlRu (Al: 50 atm %, Ru: 50 atm %) alloy as a sputtering target, the seed layer 2a made of the AlRu alloy and having a thickness of 30 nm was formed on the glass substrate 1 by sputtering. Then, using a CrMo (Cr: 80 atm %, Mo: 20 atm %) alloy as a sputtering target, the underlayer 2b made of the CrMo alloy and having a thickness of 20 nm was formed on the seed layer 2a by sputtering. Then, using a CoCrPtB (Cr: 20 atm %, Pt: 12 atm %, B: 5 atm %, the remainder: Co) alloy as a sputtering target, the magnetic layer 3 having a thickness of 6 nm was formed on the underlayer 2b. This magnetic layer 3 serves for magnetic recording.

Then, on the disk having been formed with the magnetic layer 3, a carbon-based protection layer 4 made of carbon, hydrogen, and nitrogen was formed by the use of plasma CVD (P-CVD). Specifically, using a mixed gas in the form of a mixture of acetylene and nitrogen in the ratio of 97%:3% as a reactive gas, deposition was carried out so that the carbon-based protection layer 4 by plasma CVD having a thickness of 4.5 nm was formed on the magnetic layer 3. The deposition rate at the time of forming the carbon-based protection layer was 1 nm/s. In the formation of the protection layer, high frequency power (frequency 27 MHz) was applied to electrodes to produce plasma. Further, a bias of −300 W was applied. As the thickness of the protection layer 4, the actual thickness was measured through cross-section observation by a transmission electron microscope (TEM). Incidentally, in this event, P-CVD film formation may be implemented as IBD (Ion Beam Deposition) by applying a voltage to plasma, or the like.

The formed carbon-based protection layer 4 was examined and confirmed to be an amorphous diamond-like carbon protection layer. The composition was examined and it was hydrogenated carbon nitride. The content of hydrogen was examined by HFS (Hydrogen Forward Scattering) and hydrogen was contained at about 15 atm % relative to hydrogenated carbon nitride. The content of nitrogen was examined by XPS (X-ray Photoelectron Spectroscopy) and nitrogen was contained at 8 atm % relative to carbon.

Then, after the formation of the carbon-based protection layer 4, the magnetic disk surface was cleaned by the use of heated ultrapure water and then further cleaned by the use of isopropyl alcohol, and then subjected to finish drying. Then, by the use of a dipping method, a lubrication layer 5 made of a PFPE (perfluoropolyether) compound was formed on the carbon-based protection layer 4. Specifically, use was made of an alcohol denatured perfluoropolyether lubricant having hydroxyl groups as polar groups at both ends of the main chain of perfluoropolyether. For the purpose of removing impurities and so on, use was made of the lubricant refined by the use of a supercritical fluid extraction method. After the formation of the lubrication layer 5 by the use of the dipping method, drying was carried out.

Then, the surface treatment was performed by the use of HFE (hydrofluoroether). Specifically, use was made of a liquid composition composed of a hydrofluoroether compound having a $C_4F_9$—O—$CH_3$ structure. The molecular weight of this hydrofluoroether is 250. Further, the surface tension is 13.6 mN/m. By depositing this hydrofluoroether composition on the surface of the lubrication layer 5 by the use of a vapor deposition method (treatment time 60 seconds), hydrofluoroether was brought into contact with the magnetic disk surface.

Then, the magnetic disk 10 was subjected to a heat treatment at 110° C. for 60 seconds. In this event, the heat treatment was performed in an atmosphere of clean degree class 5 of a clean environment defined in Japanese Industrial Standard (JIS) B9920.

In this manner, the magnetic disk 10 was manufactured. The thickness of the lubrication layer 5 after burning was 1.2 nm. Observing the surface roughness of the obtained magnetic disk 10 by the use of the AFM, it was confirmed to be a smooth surface having Rmax of 4 nm and Ra of 0.4 nm.

Further, the glide height was measured to be 4.5 nm. In order to stably achieve a flying height of the magnetic head being 10 nm or less, the glide height of the magnetic disk is preferably set to 5 nm or less.

With respect to the obtained magnetic disk 10, various performances were evaluated and analyzed in the following manner.

(1) Surface Tension Measurement (a) Extended Fowkes Equation

Tetradecane (surface energy; $\gamma Ld$ 26.7 mN/m, $\gamma Lp$ 0 mN/m, $\gamma Lh$ 0 mN/m, $\gamma L$ 26.7 mN/m), methylene iodide (surface energy; $\gamma Ld$ 46.8 mN/m, $\gamma Lp$ 4 mN/m, $\gamma Lh$ 0 mN/m, $\gamma L$ 50.8 mN/m), and water (surface energy; $\gamma Ld$ 29.1 mN/m, $\gamma Lp$ 1.3 mN/m, $\gamma Lh$ 42.4 mN/m, $\gamma L$ 72.8 mN/m) were used as liquids and angles (contact angles) between the liquids and the solid body surface in the magnetic disk obtained as described above were measured. The results were tetradecane 60.0°, methylene iodide 86.8°, and water 93.5°.

First, in the case of having used tetradecane, $\gamma Sd$ was derived.

$$\cos(60°)=\{2(\gamma Sd\cdot 26.7)0.5+2(\gamma Sp\cdot 0)0.5+2(\gamma Sh\cdot 0)0.5\}/26.7-1$$

Since the second and third terms are 0, $\gamma Sd=15.02$ mN/m.

Then, in the case of having used methylene iodide, $\gamma Sp$ was derived.

$$\cos(86.8°)=\{2(15.02\cdot 46.8)0.5+2(\gamma Sp\cdot 4)0.5+2(\gamma Sh\cdot 0)0.5\}/50.8-1$$

Since the third term is 0, $\gamma Sp=0.023$ mN/m.

Then, in the case of having used water, $\gamma Sh$ was derived.

$$\cos(93.5°)=\{2(15.02\cdot 29.1)0.5+2(0.023\cdot 1.3)0.5+2(\gamma Sh\cdot 42.4)0.5\}/72.8-1$$

Thus, $\gamma Sh=4.07$ mN/m.

Therefore, from $\gamma S=\gamma Sd+\gamma Sp+\gamma Sh$, $\gamma S=19.11$ mN/m.

(b) Van Oss Equation

Tetradecane (surface energy; $\gamma L$ 26.7 mN/m, $\gamma LLW$ 26.7 mN/m, $\gamma L^+$ 0.0 mN/m, $\gamma L^-$ 0.0 mN/m), water (surface energy; $\gamma L$ 72.8 mN/m, $\gamma LLW$ 21.8 mN/m, $\gamma L^+$ 25.5 mN/m, $\gamma L^-$ 25.5 mN/m), and ethylene glycol (surface energy; $\gamma L$ 48.0 mN/m, $\gamma LLW$ 29.0 mN/m, $\gamma L^+$ 1.92 mN/m, $\gamma L^-$ 47.0 mN/m) were used as liquids and contact angles between the liquids and the solid body surface in the magnetic disk obtained as described above were measured. The results were tetradecane 60.0°, water 93.5°, and ethylene glycol 74.5°.

First, in the case of having used tetradecane, $\gamma SLW$ was derived.

$$\cos(60°)=\{2(\gamma SLW\cdot 26.7)0.5+2(0\cdot 0)0.5+2(0\cdot 0)0.5\}/26.7-1$$

Therefore, $\gamma SLW=15.02$ mN/m.

Similarly, in the case of having used water, $$\cos(93.5°)=\{2(15.02\cdot 21.8)0.5+2(\gamma S^-\cdot 25.5)0.5+2(\gamma S^+\cdot 25.5)0.5\}/72.8-1$$

Similarly, in the case of having used ethylene glycol, $$\cos(74.5°)=\{2(15.02\cdot 29.0)0.5+2(\gamma S^-\cdot 1.92)0.5+2(\gamma S^+\cdot 47.0)0.5\}/48-1$$

From the above two simultaneous equations, $\gamma S^-=5.07$ mN/m and $\gamma S^+=0.88$ mN/m.

Further, $\gamma S$ is $$\gamma S=\gamma SLW+\gamma SA\cdot B=\gamma SLW+2\sqrt{(\gamma S^+\cdot \gamma S^-)}$$

Therefore, $$\gamma S=15.02+2(5.07\cdot 0.88)0.5=19.25 \text{ mN/m}$$

(c) Zisman Equation

Nonpolar (Van der Waals) alkanes having the following surface tensions were used as liquids and contact angles between the liquids and the solid body surface in the foregoing magnetic disk were derived.

|  | surface tension (mN/m) | contact angle [θ] (degree) |
|---|---|---|
| pentane | 18.25 | 37.7 |
| hexane | 20.4 | 40.1 |
| octane | 21.8 | 52.8 |
| decane | 23.9 | 59.6 |
| dodecane | 25.4 | 66.3 |
| tetradecane | 26.7 | 66.5 |
| hexadecane | 27.6 | 73.0 |

$\cos\theta$ of the contact angles were plotted against the surface tensions of the respective liquids and, by linear approximation, an approximate expression $y=-0.0546x+1.8173$ ($R^2=0.9641$, y: $\cos\theta$, x: surface tension of liquid) was obtained. In this approximate expression, the surface tension where $\cos\theta$ became 1 was derived as a critical surface tension ($\gamma c$). This $\gamma c$ was 14.96 mN/m.

The contact angle was measured by the following method.

1 µl of the foregoing liquid was dropped onto the surface of the magnetic disk 10 and a contact angle was measured after 10 seconds from dropping. Measurement was carried out twice and the mean value thereof was derived as a contact angle.

(2) Fly Stiction Test 100 magnetic disks 10 were manufactured and a whole-surface glide inspection was performed with respect to these 100 magnetic disks by the use of a magnetic head having a flying height of 10 nm. Upon occurrence of a fly stiction trouble, glide signals monitored by a PZT sensor (piezoelectric element) disposed in the magnetic head abruptly diverge at all tracks of the magnetic disk. Accordingly, it is possible to judge the occurrence thereof through observation by the use of an oscilloscope. When the fly stiction occurs, the passing rate of the inspection decreases sharply. Therefore, the tendency of occurrence of fly stiction can be seen based on the inspection passing rate.

As the passing rate (yield) of the fly stiction test increases, it becomes more desirable because the cost decreases. On the other hand, if it is 90% or more, no issue is raised. When the passing rate of the fly stiction test is 80%, although there is an increase in cost, it is within an allowable range. The results of the fly stiction test are shown in Table 1.

(3) LUL Durability Test

An LUL durability test was performed using a 2.5-inch HDD that rotates at 5400 rpm and a magnetic head having a flying height of 10 nm. An NPAB (negative pressure type) slider was used as a slider of the magnetic head and a GMR element was used as a reproduction element. The magnetic disk 10 was mounted in this HDD and the LUL operation was continuously carried out by the magnetic head. By measuring the number of LUL times the HDD endured without failure, the LUL durability was evaluated. The results of the LUL durability test are shown in Table 1.

Comparative Example 1

In the manufacture of a magnetic disk of Example 1, the processing was performed like in Example 1 except that the surface treatment by HFE (hydrofluoroether) was not carried out. The results are shown in Table 1.

Examples 2 to 4

In the manufacture of a magnetic disk of Example 1, the processing was performed like in Example 1 except that the treatment time by HFE (hydrofluoroether) was changed as shown in Table 1. The results are shown in Table 1.

TABLE 1

|  | Example 1 | Comparative Example 1 | Example 2 | Example 3 | Example 4 |
|---|---|---|---|---|---|
| Hydro-fluoro-ether Treatment | yes (vapor deposition) | no | yes (vapor deposition) | yes (vapor deposition) | yes (vapor deposition) |
| Treatment Time | 60 seconds | — | 10 seconds | 20 seconds | 30 seconds |
| γSd (mN/m) | 15.02 | 17.66 | 17.47 | 16.03 | 15.87 |
| γSp (mN/m) | 0.02 | 2.23 | 1.14 | 0.55 | 0.49 |
| γSh (mN/m) | 4.07 | 9.52 | 2.85 | 2.46 | 2.25 |
| γS (mN/m) | 19.11 | 29.41 | 21.45 | 19.04 | 18.61 |
| γSLW (mN/m) | 15.02 | 17.66 | 17.47 | 16.03 | 15.87 |
| γS$^-$ (mN/m) | 5.07 | 10.45 | 4.24 | 3.85 | 3.42 |
| γS$^+$ (mN/m) | 0.88 | 2.85 | 0.92 | 0.64 | 0.66 |
| γS (mN/m) | 19.25 | 28.57 | 21.42 | 19.18 | 18.88 |
| Critical Surface Tension [γc] (mN/m) | 14.96 | 17.12 | 16.93 | 15.55 | 15.42 |
| Fly Stiction Test (Passing Rate) | 98% | 70% | 81% | 88% | 93% |
| LUL (Load Unload) Durability Test (Number of Durable Times) | durable 1,000,000 times or more | failed at 600,000 times | durable 1,000,000 times or more | durable 1,000,000 times or more | durable 1,000,000 times or more |

The magnetic disk of this invention can prevent a fly stiction trouble, a corrosion failure, and so on to suppress a malfunction and is thus excellent in safety even when a magnetic head performs a flying operation at a flying height of, for example, 10 nm or less, and is suitably used particularly in an HDD of the LUL system.

Although this invention has been described above in detail with reference to the examples, it is needless to say that various changes can be made by a person skilled in the art without departing from the scope of claims.

What is claimed is:

1. A manufacturing method of a magnetic disk having a magnetic layer, a protection layer, and a lubrication layer formed on a substrate in this order, comprising the steps of:
   forming said lubrication layer as a film of a perfluoropolyether compound having a flexible main chain portion containing fluorine and polar groups at ends of the main chain, the polar groups comprising first polar groups within said lubrication layer, having unexposed ends and being oriented towards said protection layer, and second polar groups that are exposed on a surface of said lubrication layer; and
   immediately after forming said lubrication layer, treating a surface of said magnetic disk by the use of a composition containing hydrofluoroether after formation of said lubrication layer such that a film of hydrofluoroether is formed on the surface of said magnetic disk such that the second polar groups have ends that are bonded to ether bond groups, due to contact by the hydrofluoroether with the surface of the lubrication layer to cover and inactivate the exposed polar groups.

2. A manufacturing method of a magnetic disk according to claim 1, wherein:
   after forming said lubrication layer on a surface of said protection layer, said disk is heated in a clean room before and/or after the treatment by the use of the composition containing hydrofluoroether in order to promote orientation of said polar groups towards the protection layer.

3. A manufacturing method of a magnetic disk according to claim 1 or 2, wherein:
   said hydrofluoroether has a molecular weight of 150 to 400.

4. A manufacturing method of a magnetic disk according to claim 1 or 2, wherein:
   the thickness of the lubrication layer is within the range of 0.5-1.5 nm.

5. A manufacturing method of a magnetic disk according to claim 1 or 2, wherein:
   said hydrofluoroether has a surface tension that is greater than 0 and no greater than 14 mN/m.

6. A manufacturing method of a magnetic disk according to claim 1 or 2, wherein after the forming and treating steps:
   a surface free energy $\gamma S$ of a surface of the magnetic disk derived by an extended Fowkes equation is greater than 0 and no greater than 24 mN/m,
   $\gamma Sd$ (dispersion force component of surface free energy) forming the surface free energy $\gamma S$ is greater than 0 and no greater than 17 mN/m,
   $\gamma Sp$ (dipole component of surface free energy) forming the surface free energy $\gamma S$ is greater than 0 and no greater than 1 mN/m, and
   $\gamma Sh$ (hydrogen bonding force component of surface free energy) forming the surface free energy $\gamma S$ is greater than 0 and no greater than 6 mN/m.

7. A manufacturing method of a magnetic disk according to claim 1 or 2, wherein after the forming and treating steps:
   a critical surface tension $\gamma c$ of a surface of the magnetic disk derived by a Zisman equation is greater than 0 and no greater than 17 mN/m.

8. A manufacturing method of a magnetic disk according to claim 1 or 2, wherein:
   said protection layer is an amorphous carbon protection layer formed by a plasma CVD method.

9. A manufacturing method of a magnetic disk according to claim 8, further comprising:
   adding nitrogen to said protection layer.

10. A manufacturing method of a magnetic disk according to claim 1 or 2, wherein:
    the number of polar groups per molecule is between two and four inclusive.

11. A manufacturing method of a magnetic disk according to claim 10, wherein:
    the polar groups are hydroxyl groups.

* * * * *